(12) United States Patent
Harrod

(10) Patent No.: US 7,451,606 B2
(45) Date of Patent: Nov. 18, 2008

(54) HVAC SYSTEM ANALYSIS TOOL

(75) Inventor: Gregory Ralph Harrod, Wichita, KS (US)

(73) Assignee: Johnson Controls Technology Company, Holland, MI (US)

( * ) Notice: Subject to any disclaimer, the term of this patent is extended or adjusted under 35 U.S.C. 154(b) by 309 days.

(21) Appl. No.: 11/326,770

(22) Filed: Jan. 6, 2006

(65) Prior Publication Data

US 2007/0157639 A1 Jul. 12, 2007

(51) Int. Cl.
F25B 49/00 (2006.01)
(52) U.S. Cl. .............................. 62/77; 62/125; 702/183
(58) Field of Classification Search .................... 62/77, 62/125–127; 700/1; 702/183, 185
See application file for complete search history.

(56) References Cited

U.S. PATENT DOCUMENTS

| | | | |
|---|---|---|---|
| 4,688,388 A * | 8/1987 | Lower et al. ................... 62/126 |
| 5,373,346 A | 12/1994 | Hocker | |
| 5,446,677 A | 8/1995 | Jensen et al. | |
| 5,495,722 A * | 3/1996 | Manson et al. ................ 62/125 |
| 5,579,993 A | 12/1996 | Ahmed et al. | |
| 5,596,507 A * | 1/1997 | Jones et al. ................. 700/276 |
| 5,682,329 A | 10/1997 | Seem et al. | |
| 5,729,474 A | 3/1998 | Hildebrand et al. | |
| 5,798,945 A | 8/1998 | Benda | |
| 5,927,398 A | 7/1999 | Maciulewicz | |
| 6,179,214 B1 | 1/2001 | Key et al. | |
| 6,223,544 B1 | 5/2001 | Seem | |
| 6,385,510 B1 | 5/2002 | Hoog et al. | |
| 6,389,331 B1 | 5/2002 | Jensen et al. | |
| 6,525,658 B2 | 2/2003 | Streetman et al. | |
| 6,535,138 B1 | 3/2003 | Dolan et al. | |
| 6,608,560 B2 | 8/2003 | Abrams | |
| 6,851,621 B1 | 2/2005 | Wacker et al. | |
| 7,383,158 B2 * | 6/2008 | Krocker et al. ............. 702/186 |
| 2003/0006779 A1 * | 1/2003 | Krigel ........................ 324/503 |
| 2003/0195640 A1 * | 10/2003 | Krocker et al. ............... 700/26 |
| 2004/0015340 A1 * | 1/2004 | Kadoi et al. .................. 703/18 |
| 2005/0040248 A1 | 2/2005 | Wacker et al. | |
| 2005/0040249 A1 | 2/2005 | Wacker et al. | |
| 2007/0032207 A1 * | 2/2007 | Shah ......................... 455/111 |

OTHER PUBLICATIONS

Joe Marchese, Understanding Wiring Diagrams Is A Necessity, May 5, 2002.*

* cited by examiner

*Primary Examiner*—William E Tapolcai
(74) *Attorney, Agent, or Firm*—McNees, Wallace, & Nurick LLC

(57) ABSTRACT

A tool for the analysis of heating, ventilation and air conditioning (HVAC) systems, methods for performing various analyses of an HVAC system with the tool, and a computer executable program used by the tool to perform the analyses are disclosed. The tool includes a processing machine, a database, a memory device having a software program executable by the processing machine, and a display device. The database stores information on each of a plurality of HVAC components and the software program is configured to identify and access information pertaining to at least one HVAC unit in an HVAC system from the database and is configured to generate a wiring diagram using the accessed information from the database that is displayed to the display device.

9 Claims, 9 Drawing Sheets

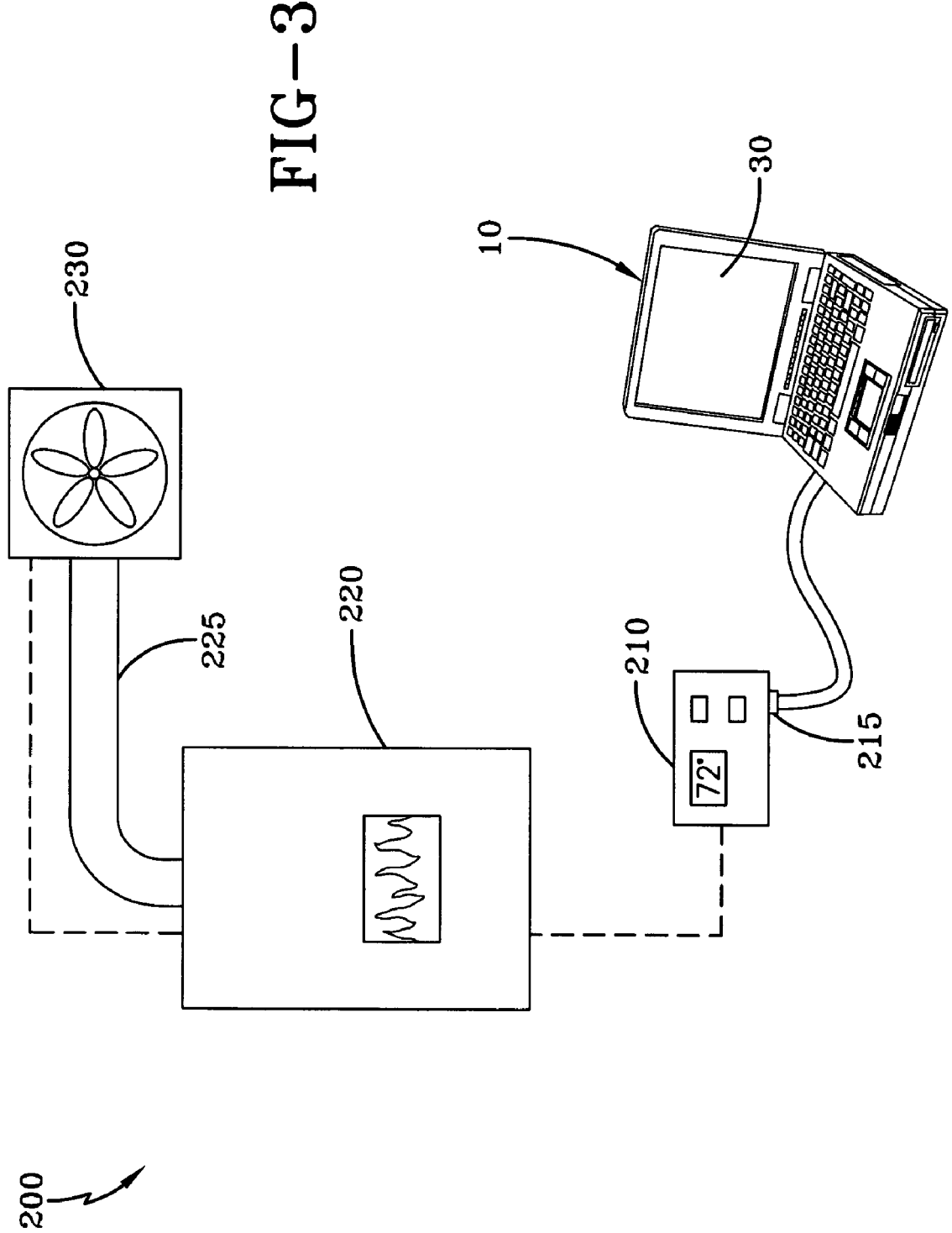

HVAC SYSTEM ANALYSIS TOOL

FIELD OF THE INVENTION

The present invention is generally directed to a tool for analyzing a heating, ventilation, and air conditioning (HVAC) system. More particularly, the invention is directed to a tool for assisting a service technician of an HVAC system by providing a troubleshooting guide and a dynamically updatable wiring diagram of the HVAC system.

BACKGROUND OF THE INVENTION

HVAC systems include a variety of different components, or units, to provide a complete heating and/or cooling cycle. These units may include heat pumps, furnaces, compressors, fans, heat exchangers, and air handlers. Each unit typically has a control device to receive control signals to operate the unit, possibly in conjunction with other units of the system, to condition a space by heating or cooling the space to a desired temperature. The control devices of the units are generally inter-connected to a thermostat that sends electronic signals to the various control devices based on a comparison between a desired temperature for the conditioned space and the actual temperature of the space.

Current methods of analyzing a failure or malfunction of the HVAC system to troubleshoot a problem with the HVAC system typically include taking measurements of different control signals of various units of the HVAC system to determine, for example, the presence and/or magnitude of an electric potential between two points in the system, typically between terminals of control units of the different HVAC components in the system. Those measurements are then manually compared to a previously prepared wiring diagram and/or troubleshooting chart to determine the operational status of the system.

Several aspects of the current methods of analysis make troubleshooting a time consuming and economically inefficient process. First, wiring charts must be prepared for the specific HVAC system to be serviced, taking into consideration each of the various units used in the HVAC system. Because of the variety in type, size and manufacturers of units that might be used in an HVAC system, wiring diagrams must often be custom made for each HVAC system. Furthermore, as various components of the HVAC system are replaced over time, terminal configurations may change such that a previously prepared wiring diagram for a once-standard system no longer accurately depicts the as-modified system.

Second, even after the wiring diagram is prepared for a particular HVAC system, the wiring diagram must reflect the state of each control signal (i.e., energized or de-energized), depending on the operation of the HVAC system that is to be performed. For example, the control signals sent from a thermostat are different depending on whether the temperature in a conditioned space is warmer or lower than a pre-established set point. Thus, different terminals of the controls of the various units in the HVAC system may be energized or de-energized to send control signals for unit operation depending on the specific operation desired of the HVAC system. For each HVAC system, a different wiring diagram may need to be produced for every possible operation of the HVAC system, including every variation of heating, cooling, and fan speeds, by way of example only. Accordingly, even after a technician measures the control signals in a malfunctioning system and manually compares them to a wiring diagram, he must then make sure he has the correct wiring diagram for the particular HVAC system operation during which the measurements were taken.

Because technician skill varies widely, human error can also play a role in whether or not an HVAC system is properly analyzed and affect the time needed to subsequently troubleshoot a problem system.

Therefore, what is needed is an analysis tool that automatically generates a wiring diagram in view of known components in an HVAC system and generates and shows expected states in HVAC system operation to a technician. In addition, what is needed is an analysis tool that can detect and measure the status of various controls of the units in the HVAC system and automatically use those measured signals to compare expected HVAC system behavior for a given operation with the actual behavior of the HVAC system under consideration.

SUMMARY OF THE INVENTION

One embodiment of the present invention is directed to an analysis tool for an HVAC system. The system analysis tool comprises a processing machine, a database storing information on about each of a plurality of HVAC components, means for inputting information on at least one HVAC unit in an HVAC system, a memory device having a software program executable by the processing machine, the software program being configured to identify and access information pertaining to the at least one HVAC unit in the HVAC system from the database and generate a wiring diagram for the at least one HVAC unit using the accessed information from the database, and a display device to display the generated wiring diagram for a user to analyze the HVAC system.

Another embodiment of the present invention is directed to a method for dynamically analyzing an HVAC system. The method includes receiving information identifying components in an HVAC system, accessing information pertaining to the identified components of the HVAC system from a database of HVAC component information, calculating expected system behavior for at least one operational state of the HVAC system using information accessed from the database, communicating with the HVAC system to determine an actual behavior of the HVAC system, comparing the calculated expected system behavior with the received actual system behavior generating a wiring diagram for the identified components of the HVAC system using the information accessed from the database of HVAC component information and the comparison of the calculated system behavior with the actual system behavior, and displaying the generated wiring diagram.

Still another embodiment of the present invention is directed to a software product comprising instructions embodied on a computer readable medium and executable by a microprocessor. The software product executes the steps of receiving information identifying components in an HVAC system, accessing information pertaining to the identified components of the HVAC system from a database of HVAC component information, calculating expected system behavior for a plurality of operational states of the HVAC system using information accessed from the database, receiving communications from the HVAC system to determine actual system behavior, comparing the calculated expected system behavior with the received actual system behavior, generating a wiring diagram for the identified components of the HVAC system using the information accessed from the database of HVAC component information and the comparison of the calculated system behavior and the actual system behavior, and displaying the generated wiring diagram.

One advantage of the invention is the ability to prepare wiring diagrams on site, after the actual components of the HVAC system are known.

Another advantage of the invention is that expected system conditions are automatically calculated for operational states of the HVAC system represented in the wiring diagram.

Still another advantage of the invention is that an integrated troubleshooting guide is provided to assist technicians when actual system conditions are different from expected system conditions for a particular operating state.

Yet another advantage of the invention is the automatic detection of discrepancies between expected system conditions and actual system conditions.

Yet another advantage of the invention is the ability to reduce the possibility of human error in analyzing and diagnosing a problem HVAC system by introducing dynamic graphical representations of the HVAC system that assists less experienced technicians.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is an HVAC system being analyzed with an HVAC system analysis tool according to an exemplary embodiment of the invention.

Where the same parts are referred to in different Figures, like numerals are used for ease of identification.

DETAILED DESCRIPTION OF THE INVENTION

Exemplary embodiments of the invention are directed to a tool for the analysis of HVAC systems, methods for performing various analyses of an HVAC system with the tool, and a computer executable program used by the tool to perform the analyses.

Figure 1:
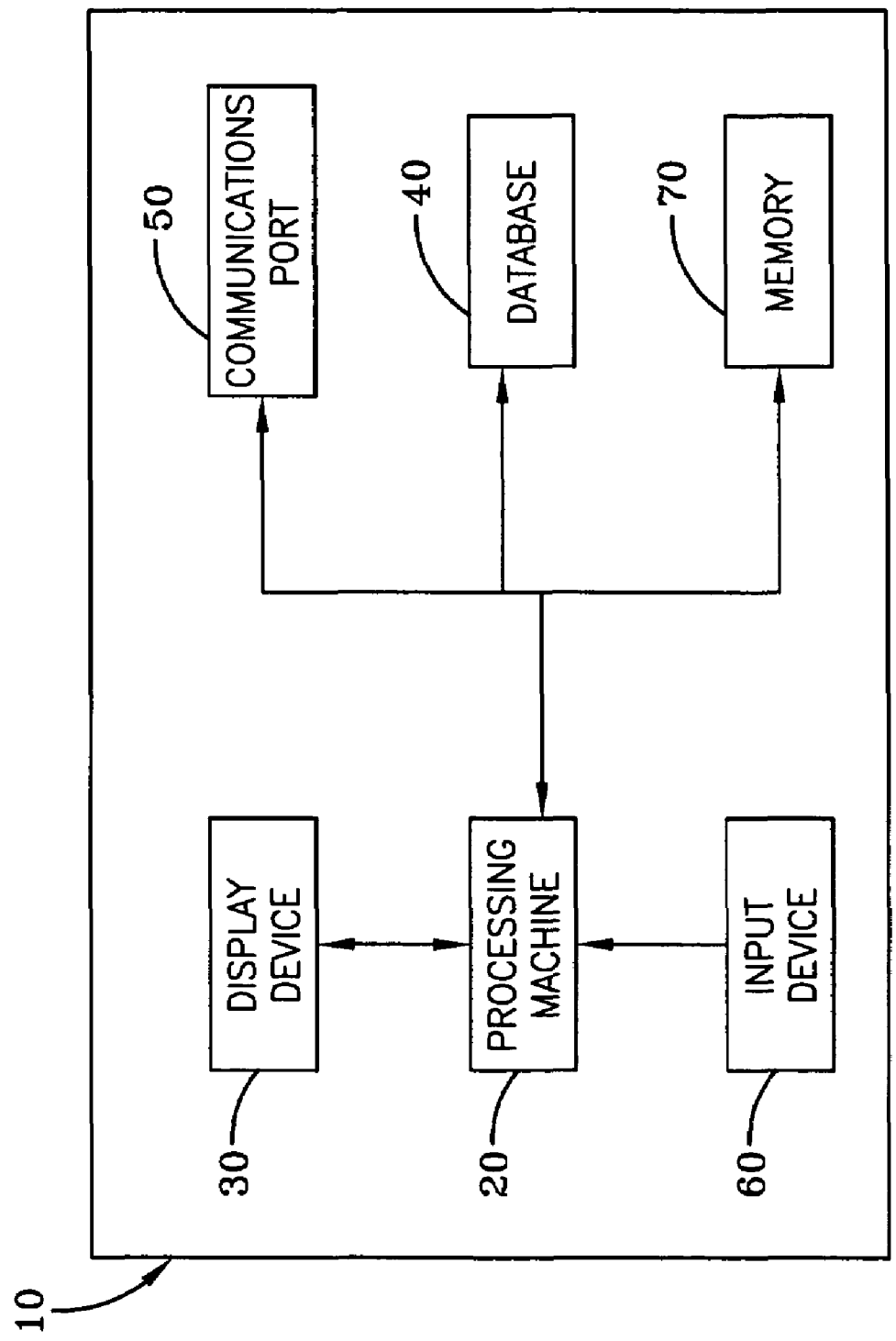
FIG. 1 is a block diagram of an HVAC system analysis tool according to an exemplary embodiment of the invention.

As shown in FIG. 1, an HVAC system analysis tool 10 includes a microprocessor, computing device or other processing machine 20 in communication with a display device 30, which can include touchscreen capability, and a database 40. The processing machine 20 executes instructions that provide the functionality of the HVAC system analysis tool 10. The instructions are preferably in the form of software which may be stored in a memory 70. The software may be stored locally with respect to the processing machine 20 or at a remote location, using conventional methods of remote software execution. Preferably, the system analysis tool 10 is an integrated component of a portable electronic device such as a personal digital assistant (PDA), laptop computer, cellular telephone, table-top computer or similar device that can easily be transported by a technician dispatched to a worksite to analyze an HVAC system. The database 40 can be stored in any electronic storage medium including, for example, a hard disk, flash memory, CD-ROM, DVD-ROM, or computer memory (RAM or ROM). The database 40 may be stored in the same memory 70 as the software executed by the processing machine 20. The information in the database 40 can be stored prior to the technician reaching the worksite or can be provided to the technician upon reaching the worksite through a communications port 50 that can provide wired or wireless communication with another computer storing the information. In addition, the database 40 can be a complete database or a subset of a larger database.

HVAC systems are typically made up of multiple individual components or units that are connected to one another to form a complete system. A single human interface, e.g., a thermostat or other control device, is used to send signals that cause the system components to act in a cooperative manner to produce a desired state of operation in response to a particular thermostat setting. Each component typically has its own individual control device that includes one or more terminals for connection to the thermostat and/or to one or more other units in the HVAC system.

In addition to a thermostat, other typical units in an HVAC system may include, by way of example only, a furnace, a fan, an air handler and a compressor. It will be appreciated that the configuration of a particular HVAC system may vary by including or omitting these or other types of HVAC units, or by varying the number of any one type of unit within the HVAC system. It will further be appreciated that a single type of HVAC unit may be available in many different models depending on the desired HVAC system capacity, space available for installation, or for a variety of other reasons. As a result, each HVAC system has distinct, and possibly even unique, wiring connections between terminals of the control devices of the HVAC units to achieve proper system operation.

During operation, the various terminals of the control devices in the HVAC system are energized or de-energized in an appropriate manner to generate the desired output of the HVAC system in accordance with well known HVAC system operation.

In order to analyze an HVAC system, whether for regular service or to troubleshoot a malfunctioning HVAC system, a wiring diagram is typically reviewed before any adequate inspection or diagnosis can be made.

To review a wiring diagram for one or more units in the HVAC system, the technician can access an appropriate wiring diagram from the system analysis tool 10. To generate a wiring diagram on the system analysis tool 10, the processing machine 20 executes software that generates a wiring diagram for an HVAC system to be analyzed. The database 40 can contain information about many different HVAC units and acts as a repository from which a wiring diagram for an HVAC system can be created.

Preferably, the database 40 includes information about many or even every different HVAC unit available from a particular manufacturer. More preferably, it includes information about HVAC units available from multiple manufacturers, any of which units might be used as a component in a single HVAC system. The database 40 further includes information, such as logical rules programmed into the database, regarding the configuration of the HVAC unit's control and how terminals on the control should be connected in view of the number and type of other HVAC units in the HVAC system.

It should be appreciated that while many HVAC systems may be uniquely created for a particular application or location, certain standard configurations of equipment may be designed for use in common settings. Thus, information corresponding to one or more complete system wiring diagrams may also be stored in the database 40, without the need to separately assemble each component of the wiring diagram using various logical rules.

Figure 6:
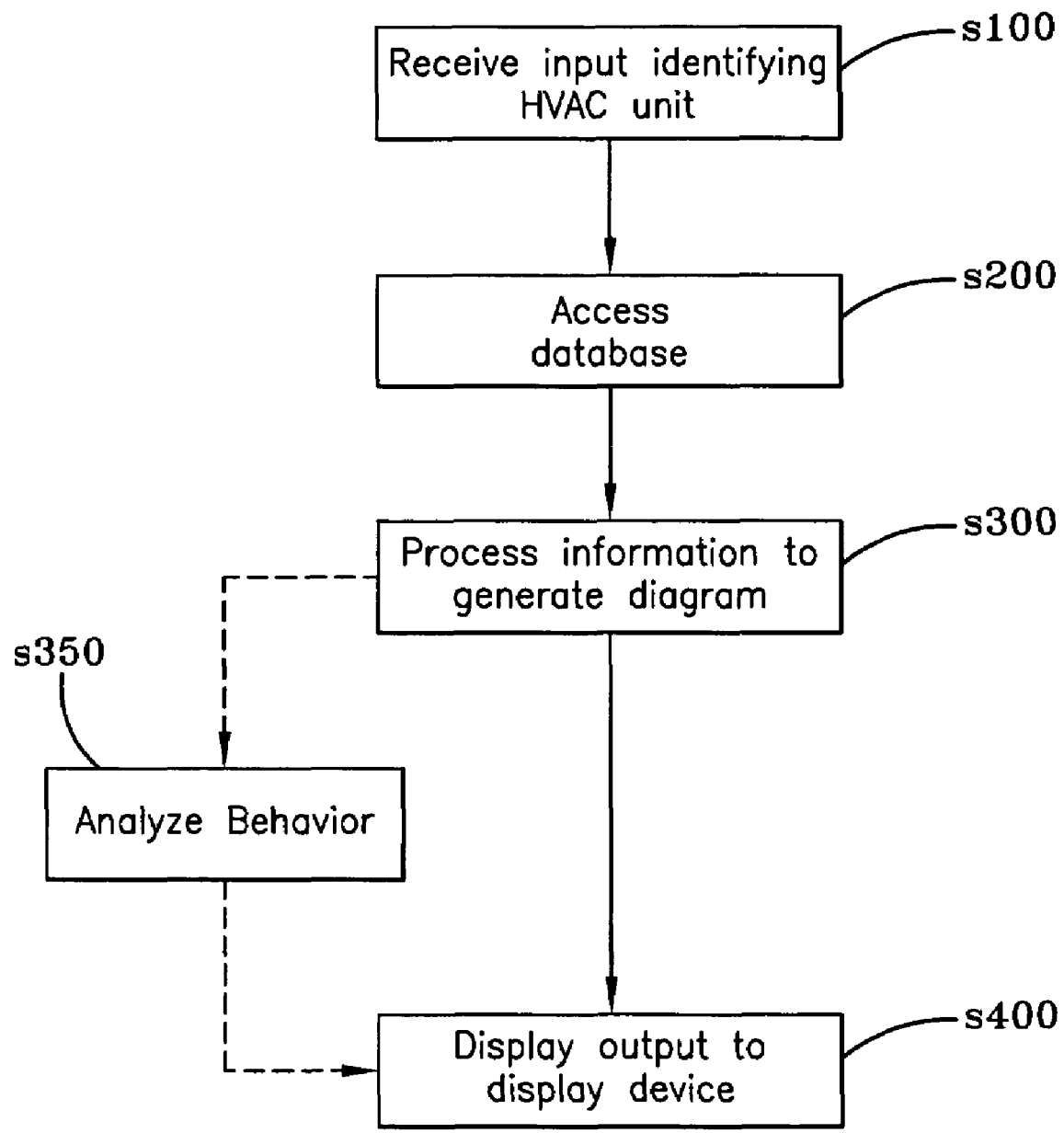
FIG. 6 is a flowchart depicting a method for generating a wiring diagram of an HVAC system according to an exemplary embodiment of the invention.

Referring now to FIG. 6, the system analysis tool 10 receives input for the identification of HVAC units present in the HVAC system for generation of the wiring chart at s100. The identification of the HVAC units may be entered by the technician either manually or through the use of the system analysis tool 10 or identification may be automatically determined by the system analysis tool 10. For example, in one embodiment, a technician observing the HVAC system might use an input device to input each unit by typing the name or ID number for the unit or by selecting the unit from a list or look-up table provided by the tool 10. In other embodiments, one or more HVAC units may have indicia of identification, such as a barcode that can be read by a barcode reader incorporated in the system analysis tool 10. Further, indicia of a unit may be received using an appropriate input device to scan indicia from a bill of materials or other indicia that was previously affixed to the unit. In still other embodiments, the HVAC unit identifications may be identified automatically by the system analysis tool 10, such as through the use of a link between a communications port 50 on the system analysis tool 10 and a corresponding port on the HVAC system, typically located on the thermostat, to retrieve previously stored information regarding the units in the HVAC system. In still other embodiments, the wiring diagram may conveniently be created or modified by the technician on location at the HVAC system to be serviced using editing features of the system analysis tool 10.

After the HVAC units have been identified, the processing machine 20 accesses the database 40 at s200 to determine the configuration of the control for each HVAC unit, including what electrical components are associated with that unit's control, such as terminals, capacitors, jumpers, etc., as well as information that permits the processing machine 20 to display a diagrammatic representation of the control on the display device 30.

The database 40 also includes information associated with each HVAC unit regarding how its components should be connected to other components and/or units in the HVAC system, depending on what other HVAC units have been identified as components of the system. For example, the database 40 may include information associated with a particular model of furnace that is indicative of a requirement that a particular control terminal be connected to a certain corresponding terminal on a first type of thermostat, but that the same furnace control terminal is connected to a different corresponding terminal if a second type of thermostat is identified.

Once the processing machine 20 has retrieved the relevant information from the database 40, that information is used by the processing machine 20 to generate the wiring diagram at s300. The processing machine 20 performs a series of logical calculations to automatically determine how the terminals of the various controls of the HVAC units should be connected for an HVAC system having the identified units. Alternatively, a technician or other user may input the connections between terminals to manually modify or even create the wiring diagram upon viewing the HVAC system at the worksite.

The units and their respective terminals, capacitors or any other electrical components, they include are graphically displayed on the HVAC system analysis tool's display device 30 as output at s400, providing a custom wiring diagram of the HVAC system. It will be appreciated however, that once generated, the entire wiring diagram does not always have to be displayed. For example, the technician may focus or zoom in on a particular area of interest.

To help a technician viewing the display, the generated wiring diagram may include text to designate terminal position, wire colors, or any other information typically, or desired to be, included on a wiring diagram that assists in differentiating aspects of the diagram for ease of reference. For example, control terminals typically include, and wiring diagrams typically reflect, letters identifying specific terminals, such as G, R and W, among others.

After the connections have been determined and the wiring diagram has been displayed, the processing machine 20 may then receive user input through an input device 60 in the system analysis tool 10 to verify that the graphical representation of each of the controls shown on the display device 30 matches the actual HVAC system that the technician is troubleshooting and that the various HVAC units and their respective controls have been properly identified. The processing machine 20 may also request or receive user input to verify that the actual wiring of the HVAC system corresponds to connections shown on the wiring diagram. If a discrepancy exists, the user may desire to manually change a misidentified HVAC control to display a correct HVAC control that properly reflects the terminal configuration of the actual HVAC control. In some cases, an initial discrepancy between the displayed wiring diagram and the HVAC system as actually wired may alert the technician that the actual HVAC system is incorrectly wired and quickly lead to a resolution of the malfunctioning system.

Figure 2:
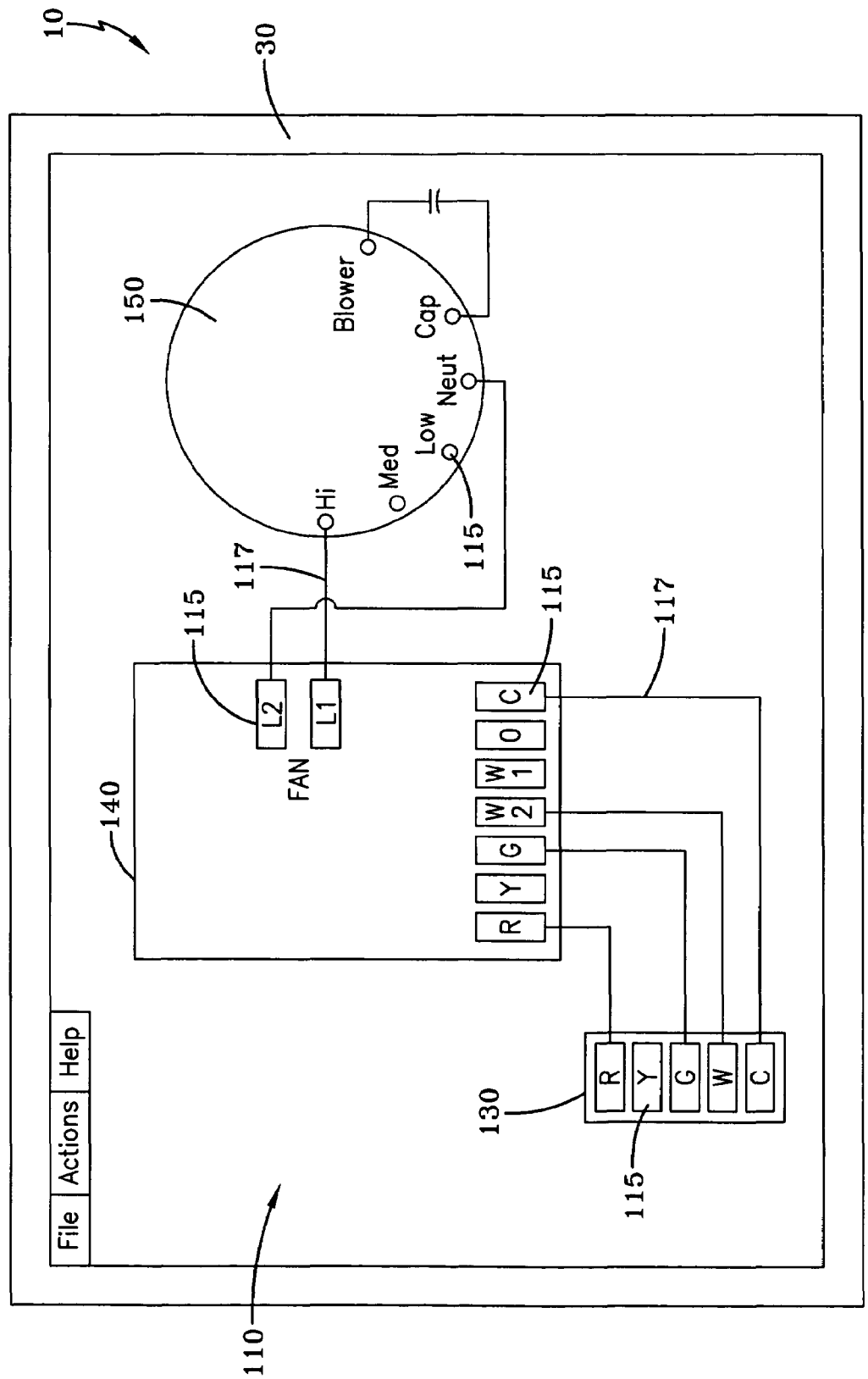
FIG. 2 is a wiring diagram generated and displayed using an HVAC system analysis tool in accordance with an exemplary embodiment of the invention.

Referring now to FIG. 2, an exemplary display of a wiring diagram for an HVAC system is shown. A generated wiring diagram 110 is displayed on the display device 30 of the analysis tool 10. The wiring diagram 110 corresponds to the HVAC system 200 shown in FIG. 3. As shown in FIG. 3, a simplified HVAC system 200, selected for purposes of illustration only, includes three HVAC units: a thermostat 210, a furnace 220, and a fan 230. The thermostat 210, furnace 220 and fan 230 are connected to one another. In addition, ductwork 225 serves as a mechanical connection to carry heated air from the furnace 220 when the fan 230 is in operation.

Returning to FIG. 2, the control boxes or modules of each of the HVAC units 210, 220, 230 are displayed along with the appropriate connections between them as calculated by the processing machine 20. A thermostat control box 130, furnace control box 140, and a fan control box 150 are each displayed diagrammatically, including any terminals 115 associated with each of the respective control boxes. FIG. 2 depicts the wiring diagram 110 in a powered down state in which the entire HVAC system 200 is shut down and no signals are being transmitted between any of the units in the HVAC system 200. Thus, at this point, the HVAC system analysis tool 10 has automatically generated a graphical representation with as much information as is typically available on conventional static paper wiring charts.

Where the system components are known in advance, a technician may desire to generate a hard copy of the system wiring diagram before he goes to a job site. For example, a technician may access the HVAC system analysis tool 10 via a conventional web site, print one or more desired wiring diagrams, and then take them with him to the job site.

The wiring diagram 110 further displays connections 117 representing the wiring of the HVAC system. As further shown in FIG. 2, the thermostat control box 130 is expected to include connections 117 from four terminals 115 on the thermostat control box 130 to four corresponding terminals 115 on the furnace control box 140. The furnace control box 140 has additional terminals 115 with connections 117 to terminals 115 on the fan control box 150. The connections shown on the wiring diagram 110 can be confirmed by the technician using the analysis tool 10 by viewing the actual controls of the HVAC system 200. The database 40 includes information, such as logical rules, corresponding to all of the input and output connection points for each HVAC control. Logical rules may be general, for example, such as a general rule that all terminals designated "C" are common/ground terminals and should always be connected to a corresponding "C" terminal. Logical rules may also be specific, for example, where a terminal found on a furnace model is connected to a particular corresponding terminal depending on the thermostat model identified. Preferably, general rules are employed wherever possible, to reduce the number of logical rules and terminal connections stored in the database 40.

Figure 2A:
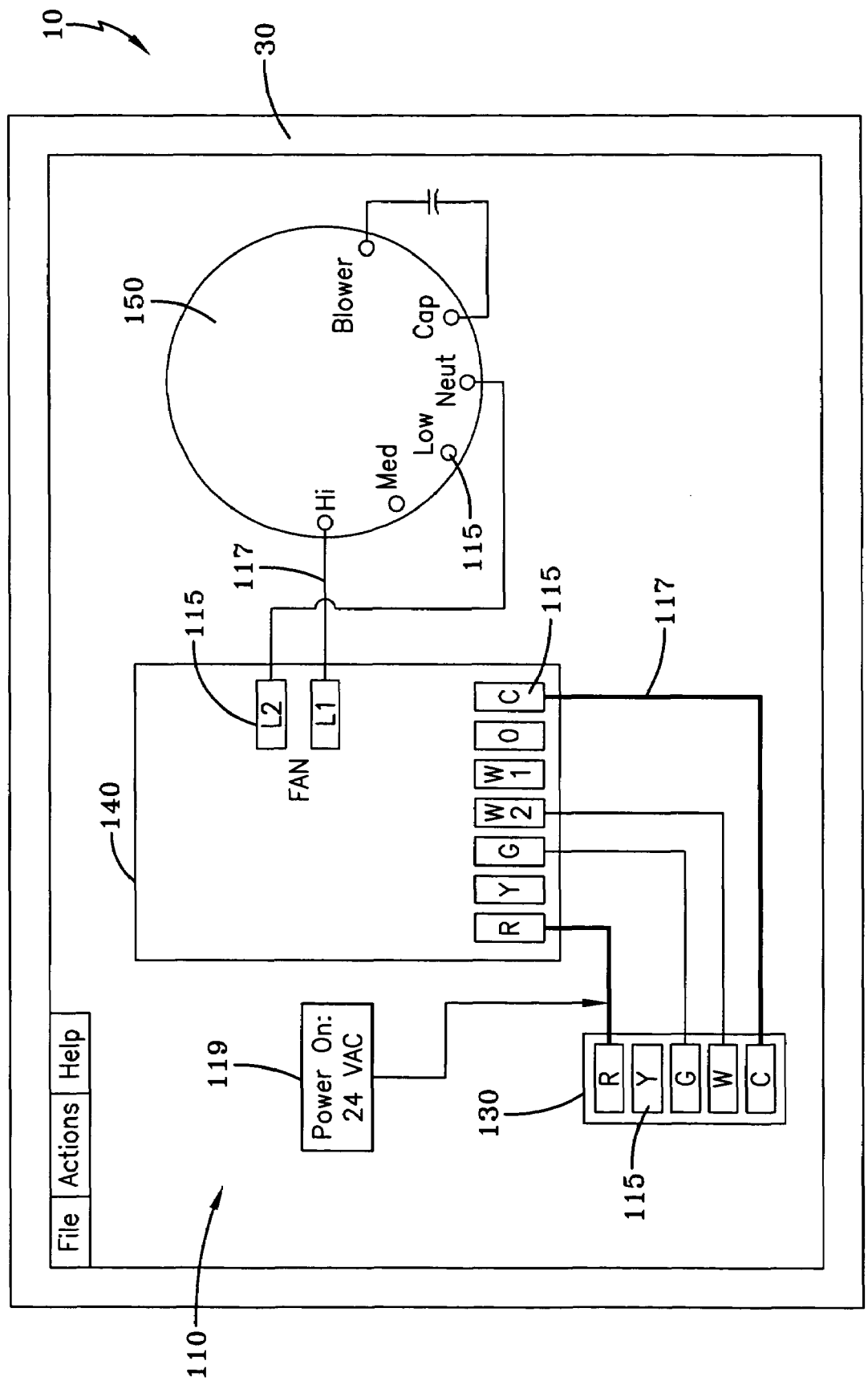
FIG. 2a is the wiring diagram of FIG. 2 illustrating a simulated operational status of an HVAC system in accordance with an exemplary embodiment of the invention.

FIG. 2a shows the generated wiring diagram 110 in a simulated first state of operation as calculated by the processing machine 20 that corresponds in this example to a powered HVAC system 200, but in which no heat call has been placed by the thermostat 210 to the furnace 220. That is, the temperature of the conditioned space is greater than the setpoint of the thermostat and the HVAC system 200 is in a ready state. To graphically represent electrical signals present between terminals during this state of operation, the processing machine 20 causes energized connections 117 to be differentiated from those connections 117 through which no electrical current flows. As shown in FIG. 2a, the display device 30 shows the wires through which an electrical signal is being sent as a bolder line style. Color, broken line styles or a combination of these or any indicia for differentiating energized from de-energized connections may also be used.

Additionally, the terminals 115 between which the electrical signals are being sent via the connections 117 may also be represented on the display device 30 in a fashion to easily differentiate them from those terminals 115 that are not connected or energized during the particular HVAC system operation under analysis.

It may also be desirable to provide additional information, for example, using one or more text blocks 119. The text block 119 may be used to convey information, such as an expected condition in the particular operational state being analyzed. As shown in FIG. 2a, the display 30 includes a text block 119 indicating that when the HVAC system 200 is in the powered on, non-heating, operational state, the electrical potential between each of the R terminal 115 of the thermostat control box 130 and the R terminal 115 of the furnace control box 140 should be 24 VAC. It should be appreciated that the common terminal C, might optionally be distinguished using text or other indicia, to indicate it is energized, although because it is grounded, no voltage should be present.

Figure 2B:
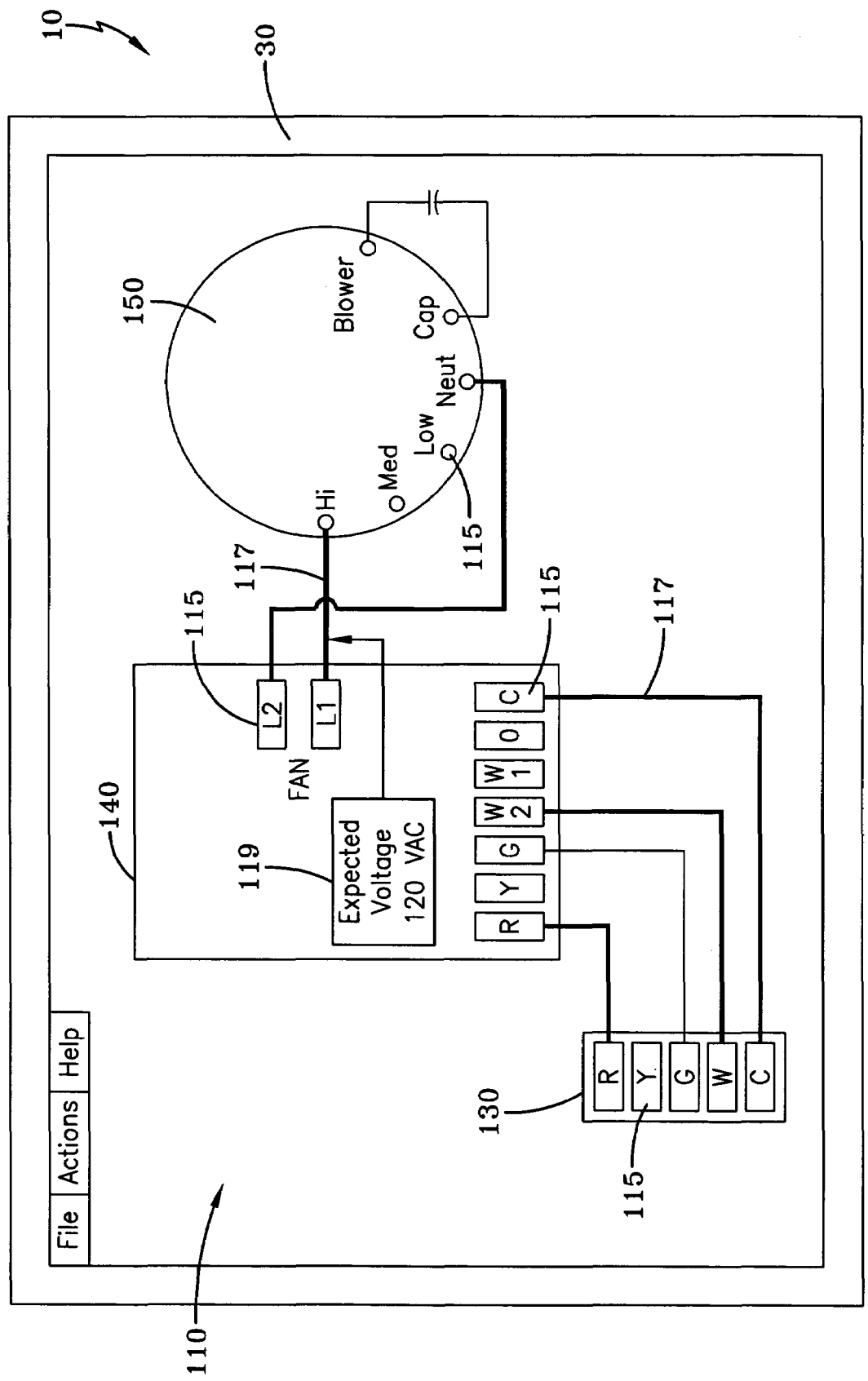
FIG. 2b is the wiring diagram of FIG. 2 illustrating a second simulated operational status of an HVAC system in accordance with an exemplary embodiment of the invention.

FIG. 2b illustrates how the displayed wiring diagram 110 changes when the HVAC system 200 is shown in a second operational state; in this case, when a heat call has been placed. The basic configuration of the wiring diagram 110, including the controls and connections 117, again remain the same as in FIGS. 2 and 2a. However, because the operational state is different, the information conveyed by the wiring diagram 110 displayed to the display device 30 is also different, showing how the terminals 115 and connections 117 of the various controls should be energized in the new operational state. As shown in FIG. 2b, a heat call has been placed to the furnace control box 140 by the thermostat control box 130. In this operational state, the W2 terminals of the thermostat and furnace control boxes 130, 140 are also energized and the furnace control box 140 in turn causes signals to be sent to the fan control box 150 that powers the fan 230 and distributes heated air to the conditioned space serviced by the HVAC system 200.

Once the wiring diagram has been provided, a technician using the HVAC system analysis tool 10 can use the information provided by the wiring diagram 110 to analyze and fix operational errors. For example, as shown in FIG. 2b, when the HVAC system is in a heat call operational state, the display device 30 includes a text block 119 that informs the technician that the voltage between the terminals 115 of the furnace control box 140 and the terminals 115 of the fan control box 150 should be 120 VAC. If, for example, the technician is troubleshooting a situation in which the fan 230 is not working, the technician can quickly determine which terminals in the HVAC system should be energized and at what voltage.

Figure 4:
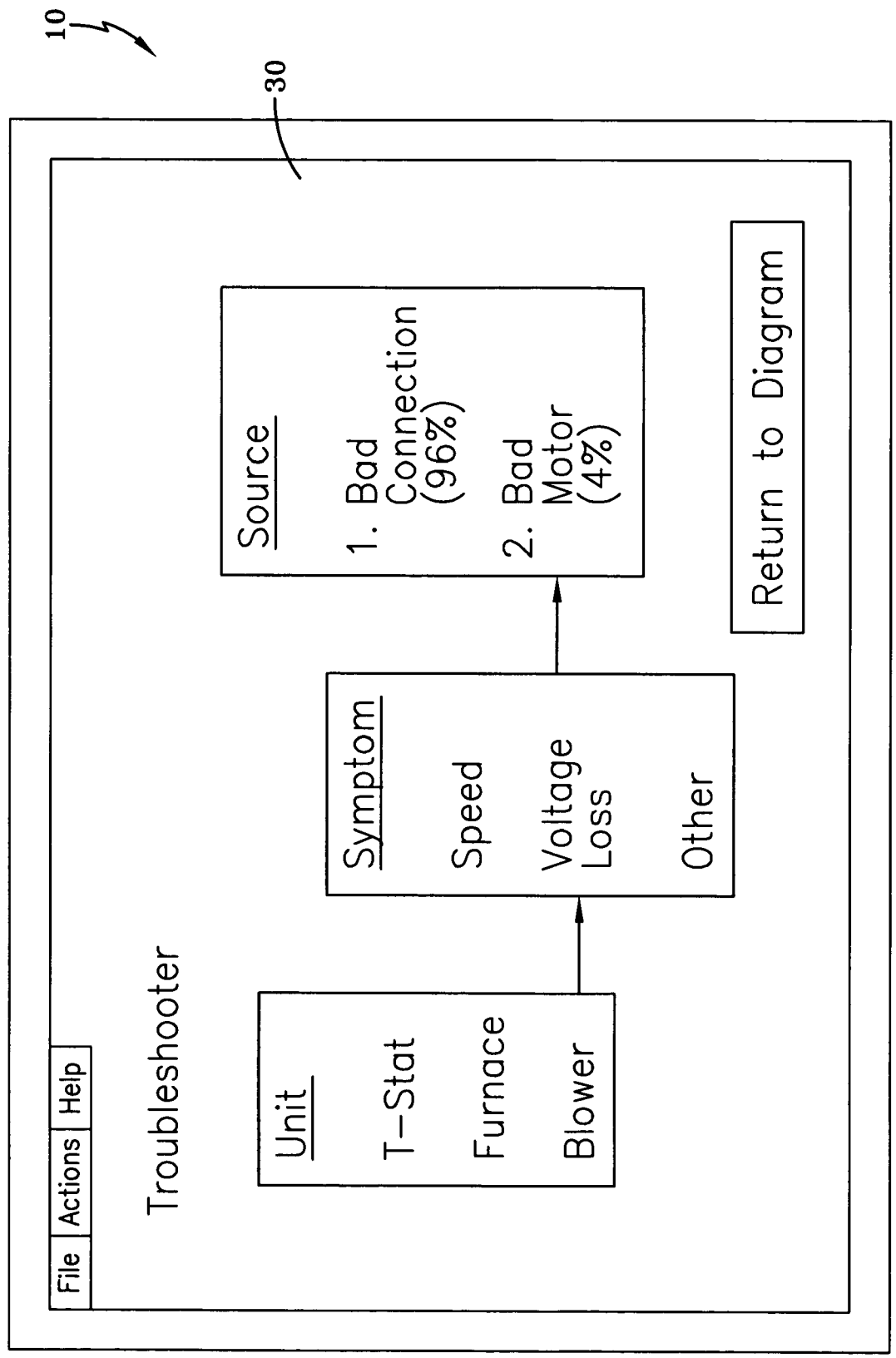
FIG. 4 is an integrated troubleshooting guide provided by the HVAC analysis tool according to exemplary embodiments of the invention.

Once a failure has been identified, the processing machine 20 may access information contained in the database 40 used by the processing machine 20 to display an integrated troubleshooting guide to the display device 30. The integrated troubleshooting guide may include a checklist containing potential causes of the now identified system failure. For example, the database 40 may contain information associated with common causes of fan failure. The processing machine 20 then displays this information graphically to the display device 30 for use by the technician, as shown in FIG. 4.

The processing machine 20 may be configured to receive input from the technician regarding the identified system failure. Using this input, the processing machine 20 displays the troubleshooting checklist in a manner that corresponds to the most likely reason associated with the particular failure. For example, if the voltage between the furnace control terminals and the fan control terminals is 0 VAC, instead of the expected 120 VAC, then the reason for the failure might likely be a bad control board or a bad connection at the inputs or terminals 115 of the control board. However, if the technician provides input that the voltage measured between the furnace control terminals and the fan control terminals is the same as the expected voltage shown on the wiring diagram 110, a different set of likely potential causes may be returned to the technician, such as a bad fan motor, for example.

Figure 7:
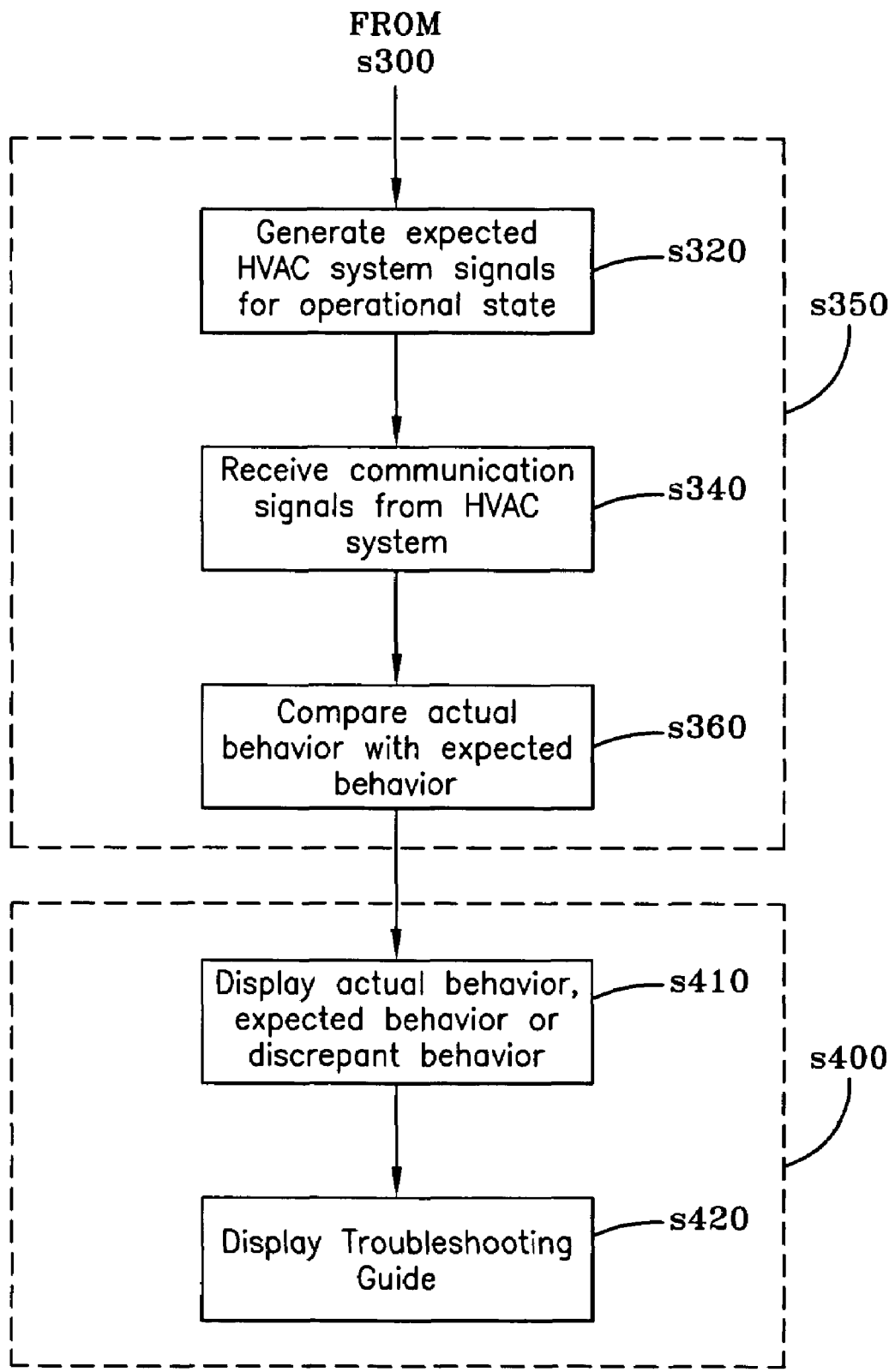
FIG. 7 is a flowchart depicting the use of a generated wiring diagram in the dynamic analysis of an HVAC system in accordance with an exemplary embodiment of the invention.

According to a preferred embodiment of the invention, the HVAC system analysis tool 10 is a dynamic system analysis tool in electrical communication with the HVAC system 200, for example, by connecting the tool 10 to a communications port 215 on the thermostat 210 or any other component of the HVAC system 200. As shown in the flowchart in FIG. 7, the tool 10 still generates expected HVAC system conditions for the various operational states of the HVAC system at s320. The dynamic version of the analysis tool 10 is configured to download the signals of the HVAC system 200 as inputs to the tool 10 at s340 and use that input to populate a second database that stores the signals and interprets them to ascertain the actual state of the HVAC system 200. The technician can elect to view the output of the tool 10 as a wiring diagram 110 showing the actual signals occurring in the HVAC system shown on the display device 30, rather than the expected signals as previously described. As the HVAC system 200 changes operational states, the signals between the various controls of the HVAC units also change. The processing machine 20 dynamically updates the display device 30 so that the technician can watch how the units in HVAC system 200 respond.

The technician may toggle between the wiring diagrams 110 for the expected operational states shown in FIGS. 2, 2*a* and 2*b* and those of the actual operational states just described to manually seek and analyze discrepancies.

Preferably, the processing machine 20 automatically performs a comparison between the calculated expected HVAC system behavior and the measured actual system behavior at s360. Any discrepancies may be displayed to the technician as part of the wiring diagram 110 on the display device 30, without the need for the technician to spend additional time diagnosing the failure. Methods of transmitting data over a communications pathway as to whether a terminal is energized are well-known. Exemplary methods include using serial communications, wired and/or wireless, and/or communication packets containing an identifier of the terminal signal (i.e., which terminal) and state of the signal (i.e., on, off, voltage, etc.) which may be sent from the control or thermostat to the HVAC system analysis tool 10.

Figure 5:
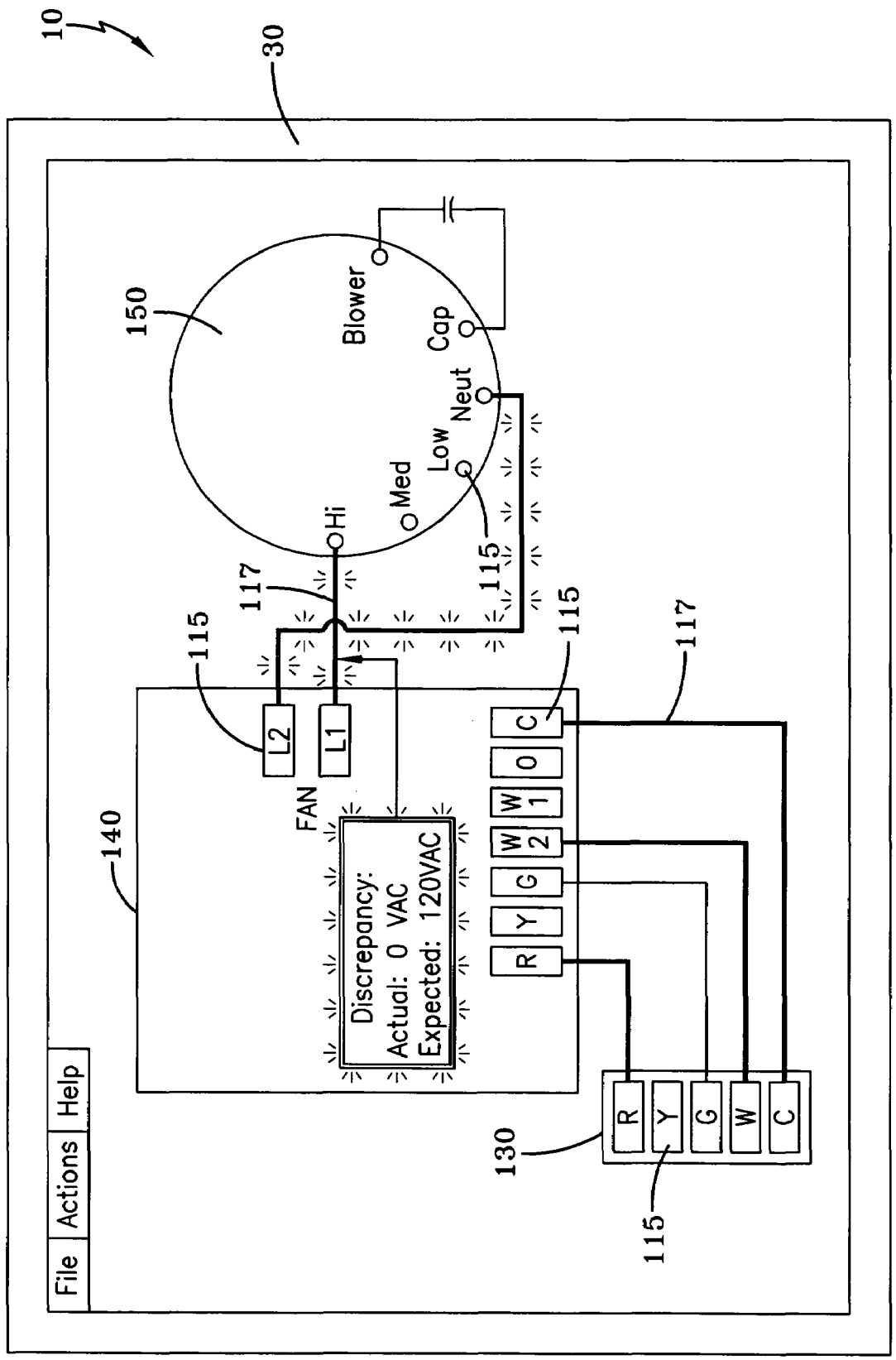
FIG. 5 is the wiring diagram of FIG. 2 illustrating a visual display of the dynamic analysis performed using the HVAC system analysis tool in accordance with an exemplary embodiment of the invention.

FIG. 5 illustrates the HVAC system analysis tool 10 as a dynamic system analysis tool. As illustrated, a discrepancy has automatically been detected by the processing machine 20 by comparing the calculated, expected signals to actual signals. The discrepancy is visually communicated to the technician on the wiring diagram by a text block 119 and/or as flashing connections that show the location of the discrepancy. It will be appreciated that audible tones or other forms of communication may also be used to alert the technician to the discrepancy. The technician can then use the integrated troubleshooting guide described above to determine the cause of the discrepancy.

Even when using the troubleshooting steps provided above, in some circumstances it may be desirable for another technician or supervisor to view the HVAC system behavior such as to provide a second level review or to assist with a particularly complex problem. In this manner, the HVAC system analysis tool 10 may be configured to transmit live streaming data of the graphical display to someone at a remote location. This could be done, for example, using an Internet connection in real time using known wireless and/or wired data transmission technologies. This may allow a service manager at a remote computer to connect to and even operate the HVAC system analysis tool 10, or to explain to the technician on site what needs to be done.

In some cases, a technician may be at a job site without the benefit of the HVAC system analysis tool 10. However, the technician may communicate with a service representative at a remote location who does have access to the HVAC system analysis tool 10. The service representative could enter components identified by the technician viewing the system to ensure that the HVAC system analysis tool 10 has the requisite input to generate the wiring diagram so that the service representative and technician could then work together by sharing information to arrive at a solution.

When in the dynamic mode, it may be desirable to have a "snapshot" of the HVAC system 200 in a particular operational state or at a particular point in time, which can be accomplished by recording incoming data, and the corresponding graphical representation for that data, for later manipulation, such as editing, image capture, and playback. This may help the technician specifically point out the problem and better explain what was happening, for example, to a customer faced with the prospect of a large repair bill.

It should be appreciated that the HVAC system analysis tool 10 may include an optional feature in which the tool doubles as a training device to educate technicians. For example, the HVAC system analysis tool 10 could be connected to a controlled HVAC system having known conditions. In the dynamic analysis mode, the technician could be required to provide an expected system behavior that could be compared against the actual measured behavior of the controlled HVAC system. Only after the technician provides an expected system behavior is the actual system behavior revealed, so that a technician's understanding of system operation can easily be tested.

It should further be appreciated that while the wiring diagrams shown in FIGS. 2-5 are illustrated as "point-to-point" style wiring diagrams, any known style of HVAC wiring diagram can be created and projected to the graphical display system using exemplary embodiments of the present invention. For example, one alternative style of wiring diagram, sometimes referred to as a "ladder" style diagram, that shows a flow of logic and current through the system between terminals, could likewise be represented using the HVAC system analysis tool 10 described herein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for the dynamic analysis of an HVAC system comprising:
   automatically receiving information identifying components in an HVAC system;
   accessing information pertaining to the identified components of the HVAC system from a database of HVAC component information;
   calculating expected system behavior for at least one operational state of the HVAC system using information accessed from the database;
   communicating with the HVAC system to determine an actual behavior of the HVAC system;
   comparing the calculated expected system behavior with the received actual system behavior;
   automatically generating a wiring diagram for the identified components of the HVAC system using the information accessed from the database of HVAC component information and the comparison of the calculated system behavior with the actual system behavior; and
   displaying the generated wiring diagram in the form of a dynamic analysis of the HVAC system.

2. The method of claim 1, wherein displaying the generated wiring diagram includes displaying information pertaining to HVAC system behavior.

3. The method of claim 2, wherein the step of displaying information pertaining to HVAC system behavior includes displaying information textually.

4. The method of claim 2, wherein the step of displaying information pertaining to HVAC system behavior includes displaying information symbolically.

5. The method of claim 2, wherein the displaying information pertaining to HVAC system behavior includes displaying system behavior selected from the group consisting of the calculated expected system behavior, the received actual system behavior, and the comparison between the expected system behavior and the actual system behavior, and combinations thereof.

6. The method of claim 1, wherein the step of communicating with the HVAC system includes receiving communications from a thermostat communications port.

7. The method of claim 1, wherein the step of accessing information pertaining to the identified components occurs at a location remote from the HVAC system being dynamically analyzed.

8. The method of claim 1 further comprising recording the communications with the HVAC system in a memory device.

9. The method of claim 1, wherein the step of displaying the generated wiring diagram includes displaying as a point-to-point wiring diagram.

* * * * *